UNITED STATES PATENT OFFICE.

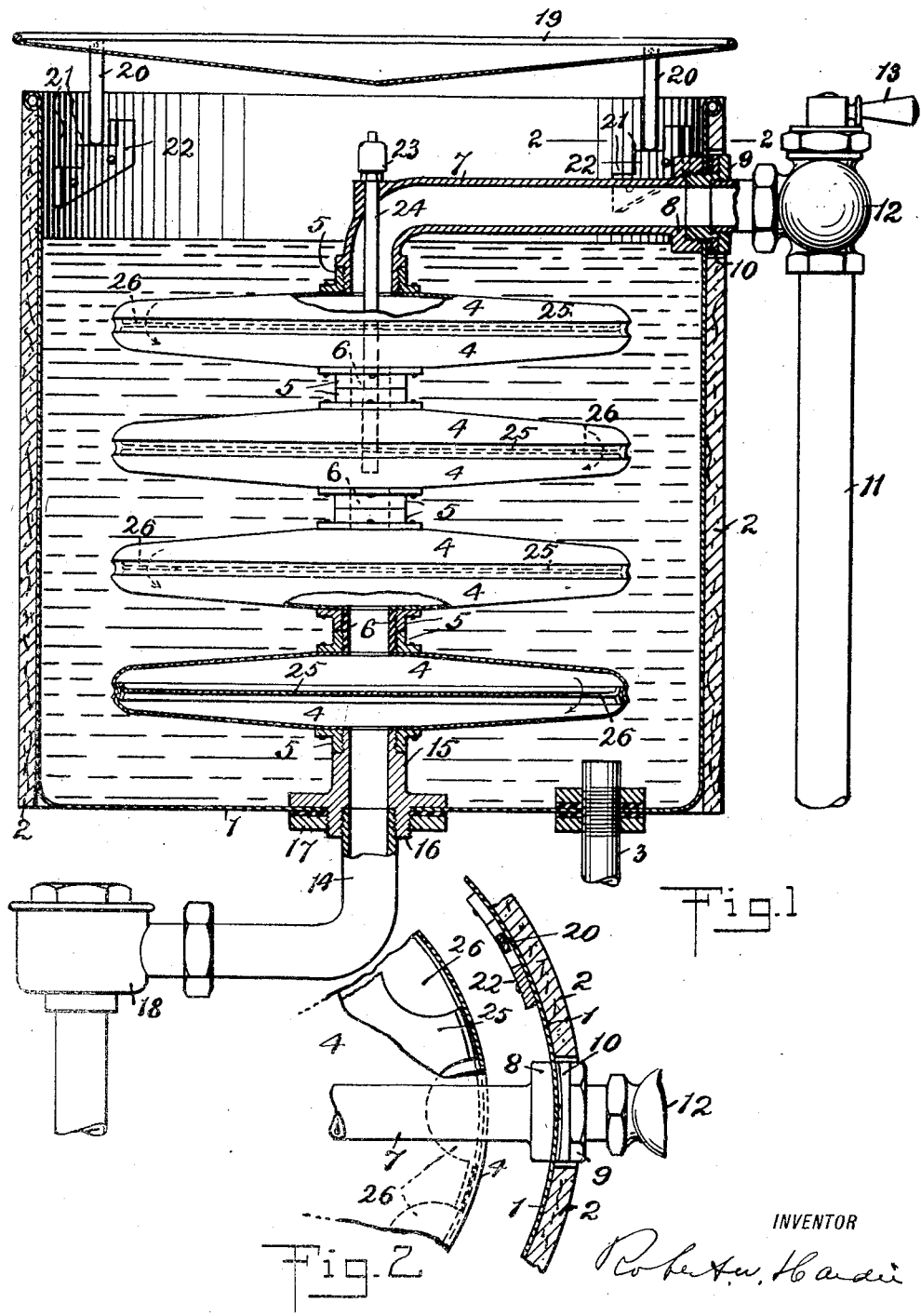

ROBERT W. HARDIE, OF WHITE PLAINS, NEW YORK, ASSIGNOR TO R. W. HARDIE COMPANY, INC., A CORPORATION OF NEW YORK.

AIR-MOISTENER.

1,337,766.  Specification of Letters Patent.  Patented Apr. 20, 1920.

Application filed November 27, 1918. Serial No. 264,481.

*To all whom it may concern:*

Be it known that I, ROBERT W. HARDIE, a citizen of the United States, and resident of White Plains, in the county of Westchester and State of New York, have invented new and useful Improvements in Air-Moisteners, of which the following is a specification.

This invention relates to that class of air moisteners in which water, contained within an open-topped receptacle, is heated and vaporized into an indoor atmosphere by means of a heating member within said receptacle, to thereby increase the percentage of relative humidity in said atmosphere.

The several objects of the invention are hereinafter stated in connection with the construction and operation of the several parts composing the invention, but the invention has for its main objects to provide a device of the character herein described that will be simple and strong in construction, not liable to get out of working order, easy to manufacture, adapted to vaporize a maximum quantity of water into an indoor atmosphere in the most facile and effective manner, and under the most economical conditions, and one that will be durable in use.

The invention has for its further object to provide a device of the character described with means for increasing its structural firmness and compactness, and for enabling the parts to be readily assembled and disconnected for transportation, cleaning, or repairing purposes.

And in order to vaporize a maximum quantity of water into an indoor atmosphere under the most favorable conditions, one of the objects of the invention is to provide means for delivering heat into the interior of a body of water to be vaporized, as uniformly as possible throughout the entire body of water.

With the foregoing and other objects in view, hereinafter stated, the invention consists of the novel construction, combination and arrangement of parts hereinafter more specifically described, and illustrated in the accompanying drawings, wherein is shown an air moistener embodying the structure of my invention in its preferred form, but it is to be understood that changes, variations and modifications may be resorted to without changing the scope of the invention.

In describing the invention in detail, reference is had to the accompanying drawings, which form a part of this specification, and wherein like characters of reference denote corresponding parts throughout the several views, and wherein—

Figure 1, is a side elevation, partly in section of an air moistener embodying my invention, and Fig. 2, is a horizontal section, partly broken away taken on the line 2—2 of Fig. 1.

As illustrated in the drawings, 1 represents an open-topped receptacle for holding the water to be vaporized by a heating member within said receptacle. The outer surface of the receptacle may be provided with a coating of asbestos or other heat insulating material 2 if desired.

The water to be evaporated may be placed in the receptable in any manner desired, preferably by means of a pipe 3, connected with the water supply of a building, and with a supply tank having a float-operated valve that maintains the water in the supply tank and receptacle, at the desired level, automatically.

The water in the receptacle is heated and vaporized by means of a heating member that consists of any desired number of chambered sections, preferably composed of concavo-convex disks 4, joined together at their outer edges in any suitable manner. In the construction shown, the outer edges of the disks are formed with a peripheral bead, concavo-convex in cross-section, that interlocks with a corresponding bead of the opposite disk. These edges may be crimped, soldered or welded together, if desired.

The specific manner in which the edges are connected together is not, however, an essential feature of the invention.

The center of the disks may be provided with an aperture, and with a flanged collar 5, that is preferably threaded interiorly so that the collars of two adjacent sections may engage, and the sections be connected together by means of a threaded nipple 6. In that manner the interior of one section of the heating member communicates with the interior of the other members. In that manner, moreover, the ends of the collars of two adjacent sections may be faced, and bear against each other to make a tight joint between the sections.

When so constructed the sections of the heating member extend in planes, spaced one above another, with water between the sections and thereby deliver heat uniformly into the interior of the body of water in the receptacle.

The upper end of the heating member, in the construction shown, is provided with an inlet pipe 7, the inner vertical offset end of said pipe having a threaded engagement with the collar 5, of the heating member. The other end of the pipe 7 is preferably provided with a recessed head 8, the face of said head being curved horizontally to correspond with the curvature of the inner surface of the wall of the receptacle. The head 8 is preferably provided with an interior thread that engages a corresponding thread formed on a coupling 9, that extends through an opening in the wall of the receptacle and bears against a washer 10, that has an inner concave face to bear against the correspondingly convex outer surface of the wall of the receptacle.

By screwing the coupling into the recessed head 8, the coupling, head, and washer make a tight connection with each other, and with the wall of the receptacle.

While it is not an essential feature of the invention, it is preferable to extend the inlet heating pipe, or its connection, through the wall of the receptacle so as to leave the upper edge of the wall of the receptacle free from any obstruction above it. A supply pipe 11 is connected with the coupling 9, and leads to a source of heat supply. The heat supply may be either steam, vapor or hot water, and the supply pipe may be provided with a valve 12 of any suitable construction.

The lower end of the heating member is connected with a return pipe 14 by means of a tubular pedestal coupling 15 that has a threaded upper end engaging the collar 5 on the adjacent section. This coupling is preferably provided with a threaded boss 16 extending through the bottom of the receptacle and engaging a washer or nut 17 on the outer surface of the bottom of the receptacle, by means of which a tight joint may be made between the pedestal coupling 15 and the bottom of the receptacle, and at the same time permit the heating member to be readily disconnected from the receptacle, as is the case with the coupling between the inlet pipe and the wall of the receptacle.

When the device is in operation, the heating medium, after passing into the heating member in the manner described, fills the several sections of the heating member, and heat is radiated therefrom into the water in the receptacle, so as to convert the water into vapor, which passes out of the receptacle into the indoor atmosphere.

When hot water is used as a heating medium the water after entering the heating member circulates through the several sections, and passes out of the heating member into the return pipe leading back into the boiler from whence it came, thereby maintaining a constant supply of heating medium in the heating member, of nearly the same temperature as the water in the boiler.

When steam or vapor is used as a heating medium, the water of condensation formed in the heating member passes outward therefrom through the return pipe and back to the boiler. A thermostatic trap 18 of ordinary construction may be connected with the return pipe so as to permit the air, as well as the water of condensation to pass out of the heating member.

In using hot water as a heating medium the thermostatic trap is not used. In such cases air is discharged from the heating member by means of an ordinary hot water air valve attached to a pipe connected with the upper part of the heating member so as to elevate the air valve above the surface of the water in the receptacle, which is preferably maintained at a level above the top of the heating member, to obtain the benefit of all the heat radiated from the top of that member.

In cases where a thermostatic trap is not used with the heating member, an air valve may be connected with the heating member by means of a pipe to elevate it above the surface of the water, but the lower end of the pipe should extend into the interior of the heating member to a point lower down than is the case where hot water is used as a heating medium.

When the device is used with a vapor heating system having a partial vacuum in the return pipe, no air valve is used ordinarily, at least none that would permit air to pass from outward into the heating member, as that would destroy the partial vacuum in the heating system with which the air moistener may be connected.

In many cases it is desirable to prevent the vapor from escaping from the receptacle in a compact volume, and to that end a baffle plate may be used with the other features of the invention. This baffle plate 19 is preferably made inclined downward from its outer margin toward its center so as to direct the movement of the vapor outward from the center of the receptacle, and also to allow any moisture that forms on the under surface by condensation to drip back into the receptacle. The baffle plate may be adjusted at various heights above the upper margin of the receptacle by means of standards 20 that are adapted to rest on steps 21 formed on brackets 22 attached to the wall of the receptacle. The amount of vapor passing out of the receptacle may be controlled, by raising or lowering the baffle plate relative to the upper margin of the wall of the receptacle.

The plate 19, by baffling the vapor arising from the receptacle receives and stores up heat received from the vapor and from the water in the receptacle and serves as a heater or radiator to heat the atmosphere above the air moistener thereby increasing its capacity for absorbing and retaining the vapor arising out of the receptacle. The baffle plate 19, moreover serves as a shield or cover for the receptacle and prevents dust and other foreign matter from falling onto or into the water in the receptacle, and when the device is not in use, the plate may be brought down on to the top of the wall of the receptacle and serve as a closure therefor. As the vapor arising from the surface of the water in the receptacle is arrested and directed outward between the baffle plate and the top of the wall of the receptacle the vapor passes into the atmosphere in the form of a ring or belt, with an air space within the ring so that the air within the ring as well as the air outside the ring or belt of vapor may absorb the vapor arising from the receptacle and diffuse it into the atmosphere far more readily than is possible if the vapor arises from the receptacle in mass form.

As illustrated in the drawings, the air moistener is provided with a supply and return pipe as used with a two pipe heating system. either steam, vapor or hot water. But in many cases the air moistener is intended to be used with a one pipe heating system, in which the water of condensation flows back to the boiler through the supply pipe. In such cases no modulating valve or thermostatic trap need be used. An ordinary radiator valve may in such cases be connected with the supply pipe.

In the drawing, an air valve, 23 is shown attached to a boss formed on the inner vertically offset end of the horizontal inlet pipe 7, of the heating member, and is provided with a pipe 24 extending through the upper section and into the next lower section, or at such other level as the air may descend to, and thereby drain the sections of air through said pipe and valve. When such an air valve is used the thermostatic trap is not used. It is not essential that the inner offset end of the inlet pipe 7, with its boss for supporting the air valve be made integral with the main horizontal body of the pipe, as shown in the drawing.

Although not essential, it is preferable to use in connection with the sections of the heating members, baffle plates 25 provided with openings 26 at their outer margins, so as to force the heating medium after entering the sections, to travel, laterally to the outer margins thereof and through the openings into the lower compartment of the sections, and thereby induce a circulation of the heating medium, as well as an even distribution thereof in the sections of the heating member. The baffle plates may be clamped at their outer edge between the outer margins or edges of the section disks or otherwise secured within said sections. The baffle plates are preferably not used in the sections of the heating member when the device is used with a one pipe steam heating system, in which the tubular connection 15 serves as an inlet-pipe for the steam and also as an outlet-pipe for the water of condensation.

By dispensing with the baffle plates in such instances the steam is permitted to pass directly to the top of the heating member, and the water of condensation from each of the sections is permitted to flow from its respective section directly through the nipples 6, and into the coupling 15 without passing through the main portion of the other sections of the heating member.

In some instances it may be desirable to make the lowest section of the heating member deeper or wider than the other sections so as to provide ample room for the water of condensation to accumulate in, when used with a steam heating system.

The disks of the sections of the heating member may if desired be provided with radial corrugations extending from the center to or toward the outer margin of said sections, so as to stiffen said disks and permit thinner plates to be used in forming said sections, and prevent the sections from expanding when the heating medium within the sections of the heating member is under unusually high pressure.

The flanged collars 5 and interlocking nipples 6 of the sections of the heating members permit the sections to be detached from each other if desired. But other means may be employed for detachably connecting the sections of the heating member together.

There are several objects accomplished by connecting the inlet pipe 7 with an aperture formed in the vertical wall of the receptacle instead of extending the inlet pipe vertically relative to the heating member, or instead of extending the inlet pipe laterally over the top of the receptacle.

By connecting the inlet-pipe with an aperture in the vertical wall of the receptacle, in the manner herein shown and described, wherein the inlet pipe proper terminates at the wall of the receptacle, the entire device including the receptacle may be readily connected with the other piping of a heating system and removed when desired for the purposes of cleaning or repairing the several parts of the device, or when desired to remove the air moistener from the cellar of a building in the summer time, when the condensation of moisture on the parts of a heating apparatus works considerable injury thereto.

Such an arrangement moreover leaves an unobstructed plane extending transversely of the top of the receptacle, and works in conjunction with the baffle plate 19, and permits the baffle plate to be adjusted at any desired distance, however slight, above the upper margin of the receptacle, so as to control the outflow of aqueous vapor from the receptacle and permits the outer margin of the baffle plate to be brought down directly on to the upper edge of the receptacle and serve as a closure when the device is not in use.

By detachably connecting the outer end of the inlet pipe 7 with the wall of the receptacle the heating member is held braced firmly in position so as to prevent any vibration of the heating member that might otherwise result in loosening the connections between the several parts of the heating member and the connections between the heating member and the inlet and outlet pipes.

Such construction has the further advantage that the inlet pipe, by being in the water in the receptacle, adds to the heating area of the heating member. Furthermore such construction, arrangement and connection with the wall of the receptacle enables the entire device, including the inlet pipe, to be assembled and connected together before being installed, and also enables the heating member to be readily removed from the receptacle, and to be reconnected therewith.

While the sections of the heating member are shown and described as circular in outline, that is not an essential feature of the invention.

Nor is it essential that all of the features of my invention be used in connection with the construction of other elements shown herein.

The tubular connection herein shown between the heating member and the receptacle may moreover be used with heating members differing in construction from that shown herein.

The baffle heating plate and its connection with the water retaining receptacle is not claimed herein for the reason that those elements are claimed in a copending application filed June 20, 1918, Serial Number 241,080.

What I claim as new and desire to secure by Letters Patent is:—

1. In combination, an open-topped water containing receptacle, a heating member arranged within said receptacle, an inlet pipe having its inner end opening into the upper part of said heating member and its outer end provided with a recessed head bearing against the inner surface of the wall of said receptacle in line with an opening in said wall, and a couping extending in part through said opening and having a threaded engagement with the head of said inlet pipe.

2. In combination, an open-topped water bearing receptacle, a heating member having inter-communicating chambered sections arranged one above another within said receptacle, and an air valve secured to the upper end of said heating member and provided with a pipe extending through and below the top section of said heating member.

3. In combination, an open-topped water containing receptacle, a heating member arranged within said receptacle, an inlet pipe having its inner end offset from the body of said pipe and connected with said heating member, and an air valve connected with the offset end of said pipe.

4. In combination, an open-topped water containing receptacle, a heating member within said receptacle having inter-communicating chambered sections arranged one above another, an inlet pipe opening at its inner end into the top section of said heating member, and secured at its outer end to the wall of said receptacle in line with an aperture therein, a controlling valve connected with said inlet pipe for controllingly admitting steam into any predetermined number of said sections independently of the next lower section, and a return pipe connected with the lower part of said heating member.

5. In combination, an open-topped water containing receptacle, a heating member within said receptacle, and a laterally extending inlet pipe having its inner end opening into the upper part of said heating member and its outer end terminating at the wall of said receptacle and provided with means for detachably securing said end to said wall in line with an opening in said wall.

6. An air moistener comprising an open-topped water containing receptacle, a heating member within said receptacle having a plurality of intercommunicating sections, an inlet pipe connected at its inner end with the upper end of said heating member, and at its outer end secured to the wall of said receptacle in line with an opening in said wall, and an outlet pipe connected with the lower part of said heating member.

7. The combination of an open topped receptacle having an inlet and an outlet aperture, a heater within said receptacle, a tubular connection between the upper part of said heater and said receptacle at the inlet aperture thereof, and a tubular connection between the lower part of said heater and said receptacle, at the outlet aperture thereof, said tubular connections being provided with means for securing said connections to said receptacle, and for enabling said heater to be removed from said receptacle without detaching said connections from said heater.

ROBERT W. HARDIE.

Witnesses:
   D. Lewis Mattern,
   C. P. Goopsli.